Figure 1:
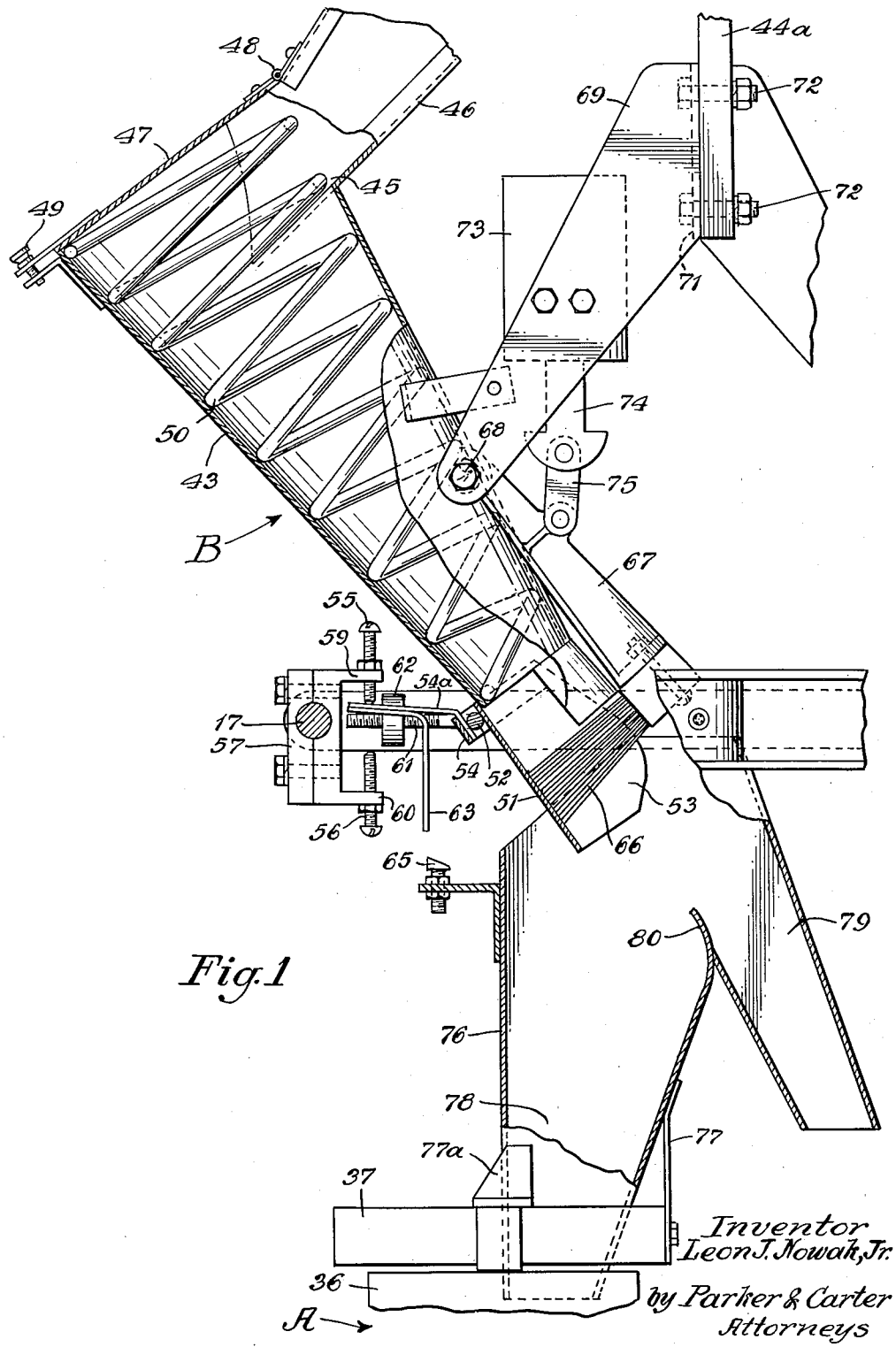

Dec. 13, 1960 L. J. NOWAK, JR 2,964,153
GRAVITY FEEDING CHUTE FOR GRANULAR PARTICLES
Original Filed Feb. 21, 1955

Inventor
Leon J. Nowak, Jr.
by Parker & Carter
Attorneys

United States Patent Office 2,964,153
Patented Dec. 13, 1960

2,964,153

GRAVITY FEEDING CHUTE FOR GRANULAR PARTICLES

Leon J. Nowak, Jr., 624 S. Knight Ave., Park Ridge, Ill.

Original application Feb. 21, 1955, Ser. No. 489,358. Divided and this application Feb. 13, 1957, Ser. No. 639,920

6 Claims.  (Cl. 193—32)

The present invention is directed to a new and improved form of twin beam weigher. It is particularly directed to an improvement over the weighing mechanism shown in my Patent 2,669,412, issued February 16, 1954, and is a division of my co-pending application Serial No. 489,358, filed February 21, 1955, entitled "Twin Beam Weigher."

One purpose of the present invention is the provision of a novel chute for a weighing apparatus wherein the chute is so formed as to prevent binding or bridging of particles flowing through the chute and insure uniform delivery therefrom.

Other purposes will appear from time to time in the course of the ensuing specification and claims.

Referring generally now to the drawing:

Figure 1 is a side elevation in section of the improved feeding device.

Like elements are designated by like characters throughout the specification and drawing.

Referring specifically now to the drawing, I illustrate at A a material-receiving receptacle which is adapted to receive material from a feeding device designated generally at B. The receptacle may be considered exemplary of a type illustrated in my Patent No. 2,669,412 issued on February 16, 1954 and directed to an automatic weighing mechanism. The present invention is directed to a new and improved gravity feeding device which has been found to be particularly effective when used with the general type of weighing apparatus described and illustrated in the aforementioned patent.

The receptacle may take the form of a bucket 36 which is supported by a member 37.

According to the invention I employ a chute 43 for delivering a stream of material toward the receptacle unit A, from any suitable hopper (not shown). As illustrated in the drawing, the chute 43 is positioned above the receptacle unit A so that the axis of the unit is inclined to the vertical and extends in a direction away from the bucket 36. It should be noted that the lower end of the chute 43 is positioned generally above the bucket 36. The chute 43 includes an inlet 45 which communicates with a conduit 46 formed integrally with the chute and leading to the hopper. The upper end of the chute includes a closure 47 which may be hingedly mounted on the conduit 46 as at 48 and secured at closed position by any suitable latching device 49. It should be noted that the chute has a gradually decreasing diameter from the upper end thereof to the lower end thereof. When material is fed downwardly through the chute it is directed along a path which overlies and extends away from the bucket 36.

In feeding material to the receptacles, I find it particularly advantageous to position a coiled spring or rod 50 throughout the length of the chute. The coils of the rod may be fixed to the inner wall of the chute by any suitable means such as welding or the like so as to form a spiral projecting inwardly from the inner walls of the chute. The rod has a varying pitch throughout the length thereof. The pitch progressively increases from the upper or inlet end of the chute to the lower or outlet end of the chute and it is varied in a manner such that the product of the cross-sectional area at any particular point in the length of the chute and the pitch of the spring at that point is generally a constant value. The particular arrangement shown minimizes a pulsating tendency of the stream of material delivered through the chute.

The lower end of the chute has an adjustable deflecting plate 51 pivotally mounted thereon as at 52. The plate 51 may include laterally spaced, wing portions 53 defining a trough therethrough. An arm 54a is secured to the bearing structure 54 which surrounds the pivot pin 52. The arm 54a moves with the movement of the plate 51 and it extends between opposed adjustable stops 55 and 56 carried by a generally U-shaped, split sleeve 57. The sleeve 57 may be mounted on a rod 17 which forms part of the frame structure of the unit.

The stops 55 and 56 may take the form of adjustable bolts which are screw-threaded through opposed legs 59 and 60 of the sleeve 57. A rod 61 may be fixed to the bearing structure 54 and have an adjustable weight 62 threaded thereon. This weight biases the plate 51 toward a position extending inwardly toward the axis of the chute 43. Such movement is limited by the stop 56. This movement of the plate 51 has the effect of varying the discharge angle of the stream of material delivered through the chute 43. The upper stop 55 may be adjusted to a position wherein the plate, at one limit of movement, is generally parallel to the axis of the chute 43 as is illustrated in the drawing. The arm 54a has a downwardly extending latching element 63 which is positioned generally intermediate the ends of the arm 61. The latching element 63 is adapted to be held in a position wherein the plate element 51 is as shown in the drawing, by a cooperable latching abutment 65.

It should be understood that the bucket 36 is adapted for vertical movement and in the position illustrated in Figure 1 the bucket is shown at a lower position wherein the latching abutment 65 is out of engagement with the latching element 63.

A closure in the form of a brush 66 is adapted to be moved between an open position spaced upwardly away from the material stream delivered through the lower outlet end of the chute 43 and a closed position illustrated in the drawing. The brush 66 is snugly received between the wings or side plates 53 when in the closed position. When the brush 66 is moved upwardly away from the plate 51 and the bucket 36 has moved downwardly so as to move the abutment 65 out of engagement with the latching element 63, the weight 62 will be effective to move the plate 51 in a counterclockwise direction about the pivot 52 thus varying the angle of discharge of the material stream. The brush is carried on an arm 67 which is pivotally mounted on a pin 68. The pivot pin 68 may be supported by a plate 69 having a flange 71 for attachment to a frame member 44a. Any suitable bolts or the like 72 may be employed to hold the plate in the position illustrated in the drawing.

The closure for the chute is adapted to be moved between open and closed positions by means of an extensible actuator 73. The actuator 73 may take the form of a solenoid having a plunger 74 interconnected with the arm 67 through a link 75. The actuator may be supported by the plate 69. In the form of the invention shown retraction of the plunger 74 moves the closure 66 to the upper or open position whereas extension of the plunger moves the closure to the closed position illustrated in Figure 1 of the drawing. Under some circumstances it may be desirable to use an air motor or hydraulic ram in place of the solenoid 73. It should be noted that movement of the closure to the closed position positively forces the plate 51 to the position illustrated in the drawing.

An auxiliary chute 76 may be carried by the bucket 36. As shown in the drawing, the chute 76 is supported on the bucket 36 as by means of upstanding members 77 and 77a. The chute 76 includes a first passageway 78 in general vertical alignment with the bucket 36 and the plate 51. The chute 76 includes a branch pipe 79 which extends from the upper end of the chute to a point positioned laterally away from the bucket 36.

The auxiliary chute 76 extends upwardly to a point above the lowermost portion of the deflecting plate 51.

The two passageways 78 and 79 merge in a deflector 80 which extends toward the outlet end of the chute 43. When the brush closure 66 is moved upwardly from the plate 51, a predetermined proportion of material will be intercepted by the deflector 80 and the bucket 36 while the remainder of the material will flow over the deflector 80 and direct the discharge 79.

Whereas, I have shown and described an operative form of my invention, I wish it to be understood that this showing is to be taken in an illustrative or diagrammatic sense only. There are many modifications to my invention which will be apparent to those skilled in the art and which will fall within the scope and spirit of my invention. The scope of the invention therefore, should be limited only by the scope of the hereinafter appended claims.

The use and operation of my invention are as follows:

The invention contemplates the gravity actuated material delivery chute which has been found to be particularly advantageous when used with a material receiving bucket and deflector of the type illustrated in the drawing. This general type of structure is used for example in the food processing industry, and the specific structure of this application has found application in the processing of coffee. When used to weigh out coffee, accuracies on the order of ⅛ to ½ of an ounce must be maintained. Consequently, the discharge from the chute into the weighing apparatus must be steady and nonpulsating so that the quantity of material passing into the containers may be accurately weighed.

Chute 43 is positioned between a storage hopper which discharges into the upper end of the chute as illustrated and described in considerably more detail in my co-pending application Serial No. 489,358 and the auxiliary chute 76. This latter chute then discharges into a weighing apparatus, such as a twin beam weigher fully shown and described in my co-pending application.

Perhaps the operation of the chute can be best visualized by referring to the behavior of an individual particle as it passes from the upward end of the chute downwardly to the discharge outlet.

Essentially it is necessary to maintain a uniform quantity rate of flow of material through the chute. In other words, if a given number of units of weight enter the chute at its upper end in a given amount of time, the same number of units of weight must pass out the discharge end in the same amount of time. Since the cross sectional area of the chute varies, the theoretical speed of any individual particle as it passes through the chute will vary from one end to the other. At the upper end, where the area of the chute is at a maximum, an individual particle will move relatively slowly, whereas at the discharge end, where the area is at a minimum, it will be moving at a substantially faster rate. Theoretically, if a particle of material were to pass directly through the chute in a straight line parallel to the axes of the chute, its speed would uniformly increase as it neared the discharge end. As a practical matter, the spiral deflecting member 50 imparts a non-linear or roughly spiral movement to the particles. This nonlinear movement of the particles aids in breaking up any lumps in the material and prevents bridging of the material in the chute while providing a uniform discharge into the receptacle unit.

Although the ideal relationship between the pitch and the spiral deflecting member and the chute have been shown, that is, a relationship in which the product of the pitch and the cross sectional area of the chute is substantially constant at any given point along the chute, it will be understood that this relationship is really a ramification of the more basic inventive concept of decreasing the cross sectional area of the chute while increasing the pitch of the spiral deflecting member.

When used with an automatic twin beam weighing apparatus, material is fed to the chute 43 through the passageway 46. The stream of material flowing downwardly through the chute 43 is directed toward the deflecting member 80 which, at certain times in the weighing cycle, deflects a predetermined proportion of material downwardly toward the bucket 36 while allowing the remainder of the material to pass through the branch pipe 79.

When the chute 43 is used with automatic weighing apparatus it is particularly advantageous to employ a deflecting plate in order to vary the angle of the stream discharged from the chute 43. When the closure 66 is withdrawn from between the side plates 53, the deflecting plate is held in the position illustrated in Figure 1 by the latching elements 63 and 65. As the bucket 36 fills to a predetermined amount the weight of the material in the bucket will tend to move the bucket downwardly where the latching element 65 moves out of engagement with the element 63 and the weight 62 is then effective to move the deflecting plate 51 in a counterclockwise direction which changes the angle of the discharging stream.

It will be clear to one skilled in the art that deviations may be made from the relationship shown in the drawings without departing from the spirit of the invention. For example, if the pitch of the spiral deflecting member 50 were increased in such relation to the cross-sectional area of the chute that the product of the area and pitch increased in a downward direction, there might be voids and areas of comparatively low density in the upper end of the chute during operation. The very fact that the area of the chute decreases downwardly however, tends to eliminate these low density spots with the net result that when material is finally discharged from the outlet it is discharged in a steady, non-pulsating stream.

It will also be noted that the spiral deflecting member 50 is open in its middle to thereby provide a substantially unobstructed gravital flow path through the chute and member 50.

I claim:

1. In a gravity feeding device, a chute having an inlet at the upper end thereof and an outlet at the lower end thereof, said chute decreasing in cross-sectional area from inlet to outlet thereof, said chute having a spiral material deflecting member in the interior thereof positioned adjacent the interior surface of the chute to thereby provide a substantially unobstructed gravital flow path therethrough, the pitch of the spiral deflecting member increasing toward the outlet as the interior cross-sectional area of the chute decreases to thereby provide a steady, nonpulsating discharge of material gravitally passing down the chute.

2. The gravity feeding device of claim 1 in which the spiral deflecting member is a rod.

3. In a gravity feeding device, a chute having an inlet at the upper end thereof and an outlet at the lower end thereof, said chute decreasing in cross-sectional area from inlet to outlet thereof, said chute having a spiral material deflecting member positioned adjacent the interior surface of the chute to thereby provide a substantially unobstructed gravital flow path therethrough, the pitch of the spiral deflecting member increasing towards the outlet as the interior cross-sectional area of the chute decreases, the relationship of the pitch of the spiral deflecting member to the cross-sectional area of the chute being such that the product of the pitch and area is substantially constant at any point along the chute to thereby provide a substantially steady, substantially non-pulsating discharge of material gravitally passing down the chute.

4. The gravity feeding device of claim 3 further characterized in that the cross-sectional area of the chute decreases substantially uniformly toward the outlet.

5. In a gravity feeding device for particles of granular material and the like, a chute having an inlet at the upper end thereof and an outlet at the lower end thereof, and means in the chute for imparting to the layer of particles moving adjacent the inner surface of the chute a non-linear movement, said means including a spiral deflector mounted adjacent the inner surface of said chute and located in the path of flow of material along the chute, said spiral deflector being open in its middle to provide a substantially unobstructed flow path therethrough, the relationship between the pitch of the spiral deflecting member and the cross-sectional area of the chute being such that the product of the pitch and area is substantially constant at any given point along the chute to thereby provide a substantially steady, substantially nonpulsating discharge of material gravitally passing down the chute.

6. In a gravity feeding device for granular particles and the like, a chute having an inlet at its upper end and an outlet at its lower end, a connection between the upper end of the chute and a source of the particles to be fed, and means in the chute for imparting to at least the particles moving along the inner surface of the chute a non-linear movement to thereby prevent bridging and packing of the particles, said means including a normally fixed generally spiral deflector mounted in said chute adjacent and within the inner surface of the chute, the relationship between the pitch of the spiral deflecting member and the cross-sectional area of the chute being such that the product of the pitch and area is substantially constant at any given point along the chute to thereby provide a substantially steady, substantially non-pulsating discharge of material gravitally passing down the chute.

References Cited in the file of this patent

UNITED STATES PATENTS

| | | |
|---|---|---|
| 143,323 | Bradford | Sept. 30, 1873 |
| 426,667 | Grissim | Apr. 29, 1890 |
| 1,413,038 | Leary | Apr. 18, 1922 |
| 1,834,917 | Gilchrist | Dec. 1, 1931 |
| 2,260,302 | Driscoll et al. | Oct. 28, 1941 |
| 2,507,245 | Dady | May 9, 1950 |